United States Patent [19]

Dunkers

[11] E Re. 30,793

[45] Reissued Nov. 10, 1981

[54] APPARATUS FOR WATER TREATMENT

[76] Inventor: Karl R. Dunkers, Hastskovagen 7, S-183 50 Taby, Sweden

[21] Appl. No.: 125,634

[22] Filed: Feb. 28, 1980

Related U.S. Patent Documents

Reissue of:

[64] Patent No.: 4,144,170
Issued: Mar. 13, 1979
Appl. No.: 834,558
Filed: Sep. 19, 1977

[30] Foreign Application Priority Data

Sep. 29, 1976 [SE] Sweden ..... 7610792
Sep. 29, 1976 [SE] Sweden ..... 7610793

[51] Int. Cl.[3] ..... B01D 21/10
[52] U.S. Cl. ..... 210/522; 210/532.1
[58] Field of Search ..... 210/801-803, 210/221.2, 521, 522, 532.1, 532.2

[56] References Cited

U.S. PATENT DOCUMENTS

| | | | |
|---|---|---|---|
| 1,800,965 | 4/1931 | Spalding | 210/776 |
| 2,603,588 | 7/1952 | Vaughan et al. | 210/801 |
| 2,673,451 | 3/1954 | Gariel | 210/521 X |
| 3,346,122 | 10/1967 | Cornelissen | 210/522 |
| 3,997,444 | 12/1976 | McGivern | 210/521 X |

FOREIGN PATENT DOCUMENTS

| | | |
|---|---|---|
| 329766 | 4/1914 | Fed. Rep. of Germany . |
| 495531 | 3/1930 | Fed. Rep. of Germany . |
| 2219441 | 10/1973 | Fed. Rep. of Germany . |
| 1578228 | 8/1969 | France . |
| 16083 | 12/1971 | Sweden . |
| 4305701 | 4/1973 | Sweden . |
| 367549 | 9/1974 | Sweden . |
| 7415671 | 12/1974 | Sweden . |
| 7415732 | 12/1974 | Sweden . |
| 7504112 | 4/1975 | Sweden . |
| 308752 | 8/1929 | United Kingdom . |
| 443601 | 3/1936 | United Kingdom . |
| 896997 | 5/1962 | United Kingdom . |
| 935989 | 9/1963 | United Kingdom . |
| 1048253 | 11/1963 | United Kingdom . |
| 1287360 | 8/1972 | United Kingdom . |
| 1309930 | 3/1973 | United Kingdom . |
| 1325745 | 8/1973 | United Kingdom . |

OTHER PUBLICATIONS

*Urban Stormwater Management and Technology: An Assessment*, EPA, Cincinnati, Ohio, EPA-670/2-74 040 (1974).

*Primary Examiner*—William A. Cuchlinski, Jr.
*Attorney, Agent, or Firm*—Stevens, Davis, Miller & Mosher

[57] ABSTRACT

The invention relates to an apparatus for treatment of water comprising inclined lamellae arranged so that settling materials as well as floating materials are separated from the water. The apparatus is devised so that the water flows in opposite directions through separate spaces between the lamallae, wherein heavy materials (sludge) settle to the bottoms of the spaces while floating materials (scum) are retained and separated in a chamber where the water changes its direction of flow. The apparatus may be arranged for separation of sludge in two fractions and for purification of the water by a combination of flotation by aeration and settling. The apparatus is useful for all types of purification processes based on separation by settling and flotation within the water and sewage treatment art. Especially of interest is the favorable application of the apparatus for treating storm water and overflow water.

5 Claims, 7 Drawing Figures

APPARATUS FOR WATER TREATMENT

Matter enclosed in heavy brackets [ ] appears in the original patent but forms no part of this reissue specification; matter printed in italics indicates the additions made by reissue.

The present invention relates to purifying of polluted water, such as sewage water, and relates to an apparatus for separating solid and liquid pollutants from such water, said apparatus being so formed that in a simple way it enables separation of both material tending to sink in the water and material tending to rise to the water surface. It can moreover be made so that it can achieve further fractioning of the separated material.

The apparatus according to the invention is formed while applying the lamella technique, known per se, i.e. it contains a packet of lamellae with small intermediate spaces, through which the water must flow while pollutants settle or rise to be thus separated from the water. The apparatus according to the invention is so formed, however, that it provides the desired separation in a more effective and advantageous way.

Separation of suspended solids using the lamella technique has been applied during recent years to an ever increasing extent for both tap water treatment as well as waste water treatment. Characteristic for the lamella technique is, inter alia, large separating surface per unit of building volume, controlled hydraulic conditions within the lamella region and relatively low plant costs. The lamella constructions on the market are mainly designed for single separation only, i.e. for separating one sludge phase. In many cases, e.g. storm water, overflow water and certain industrial waste waters, the ingoing flow can however obtain considerable amounts of oil, scum and sand. In lamella units designed for single separation, the oil and scum in such cases remain in the confined space between the lamellae. The scum sometimes forms itself here into bodies of the size of footballs which are very difficult to remove and can completely block the spaces between the lamellae. Certain known lamella structures are indeed equipped with means for removing scum, but since the shape of the lamellae in them compels placing the scum separating means in just the space between the lamellae, both the function and possibility of application of these structures are strongly limited.

Relatively large amounts of sand are usually present in storm water and rain water from combined draining systems. In these cases, sand can naturally be separated in separate sand traps. With regard to the sometimes very large amounts of water during rainy periods, separate sand trap installations would, however, be unreasonably large and expensive. Because of the large flow variations they would also be stricken by the disadvantage that during periods of low inflow they would separate heavily sludged-up sand, whereas for large inflow they would allow finer sand fractions to pass.

With lamella installations designed only for single phase sludge separation, the sand will naturally be separated at the same time as the sludge into a sand sludge mixture. In many cases, inter alia when treating storm water and overflow water, this is not very desirable since the sludge should preferably be led to the sewage sytem for further transport and treatment in a waste water treatment plant in the vicinity, while the separated sand can be stored directly on site for drying and taking in a dry state afterwards.

The lamella structures on the market have been chiefly developed for applications with relatively limited flow variations—e.g. chemical precipitation of municipal and industrial waste water, and the design of the lamella units with adjacent inlet and outlet channels has as a consequence thereof been dictated by certain relationships between total lamella surface, flow, selected surface loadings, method of taking away the separated phase etc. In the application of lamella technique to operations with large flow variations and large incoming amounts of water these relationships are consequently disturbed with the result that channels, lamellae, and lamella spaces cannot meet the demands set by these applications. On the other hand, the lamella technique offers in general an increasingly favorable plant cost for increasingly large flows and flow variations, it is therefore doubly lamentable that there are the deficiences acounted for above in today's lamella technique.

The main object of the present invention is to provide a new type of lamella installations where the deficiences described above with sand sludge separation, removal of scum and oil and the design of the lamella spaces, ducts and channels have been eliminated. Other objects and advantages of the invention will be apparent as the description proceeds.

The characteristic features of the invention appear from the appended claims.

Some embodiments of the invention will now be described in detail while referring to the appended drawings.

Figures 1, 2:
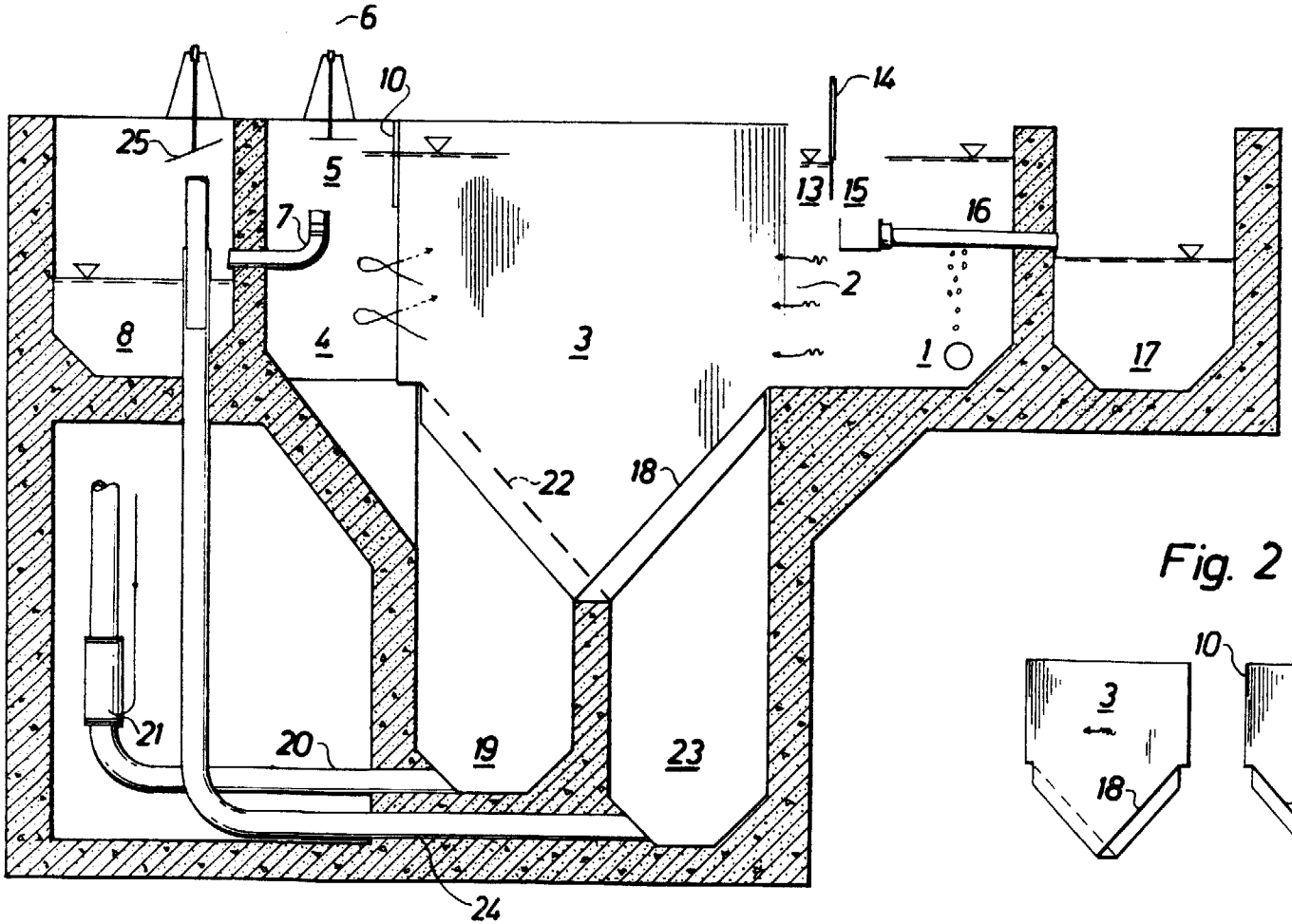
FIG. 1 shows an apparatus, according to the invention, in a vertical cross section.
FIG. 2 shows a side view of two of the lamellae included in the apparatus according to FIG. 1.

In FIGS. 1 to 6, it will be seen that water is led into the lamella installation by an inlet channel 1, and from here through openings 2 to the gaps 3, formed between a number of inclined lamellae. After passage through these gaps, hereafter called input gaps, the water is collected in an open chamber 4 equipped with troughs 5 and associated operating equipment 6 for separating scum and oil, which is taken to a collecting channel 8 from a trough 5 via a duct 7. In the open chamber 4 the water flow is turned in the opposite direction towards the gaps 9, hereinafter called output gaps, adjacent the input gaps 3.

FIG. 2 schematically illustrates how alternate gaps function as input gaps 3 and output gaps 9. Upwardly on the inlet side at the output gaps 9 there is arranged a scum screen 10, the task of which is to prevent oil and scum from accompanying the outgoing flow. An inlet screen 11 prevents direct passage from the inlet channel 1 to the output gaps 9. In principle, an arbitrary number of gaps can be chosen as input gaps while the remaining gaps function as output gaps.

The water liberated from scum, oil and settleable solids (FIGS. 1 and 3) is taken from the output gaps 9 through the overflow openings 12 to the troughs 13 equipped with adjustable wires 14, the task of which is to ensure a uniform distribution of the flow to all lamella gaps. After the weirs 14, the water is collected into secondary collecting troughs 15, wherefrom it goes through ducts 16 to a central collecting channel 17 for outgoing water.

According to the present invention, settleable solids can be separated in one or two bottom fractions. FIG. 1 shows a section of a lamella installation for two fractions, while FIG. 3 shows the corresponding construction for separating a single bottom fraction only.

According to FIG. 1 heavier settleable solids, e.g. sand in storm water treatment, is separated in the input gaps 3 by their settling against the inclined bottom 18 of the gap and from here further downwards to a separate collecting chamber 19 intended for heavier sedimented particles. From this chamber the separated heavier material is pumped via a suction line 20 and a pump 21—usually of the airlift pump type—to a stockpile for drying and taking away.

Because of lower flow rate and less surface load, light particles settle in the output gaps 9 and are passed, via the inclined bottoms 22 of the gaps, down to a separate collecting chamber 23 for transport away from here, through a duct 24 and an adjustable overflow pipe 25, either to a separate collecting channel or (as shown in FIG. 1) to the same channel 8 which collects oil and scum for further treatment. The task of the overflow pipe 25 is to provide a hydrostatic differential pressure so that continuous removal of this bottom fraction is also possible.

Figure 3:
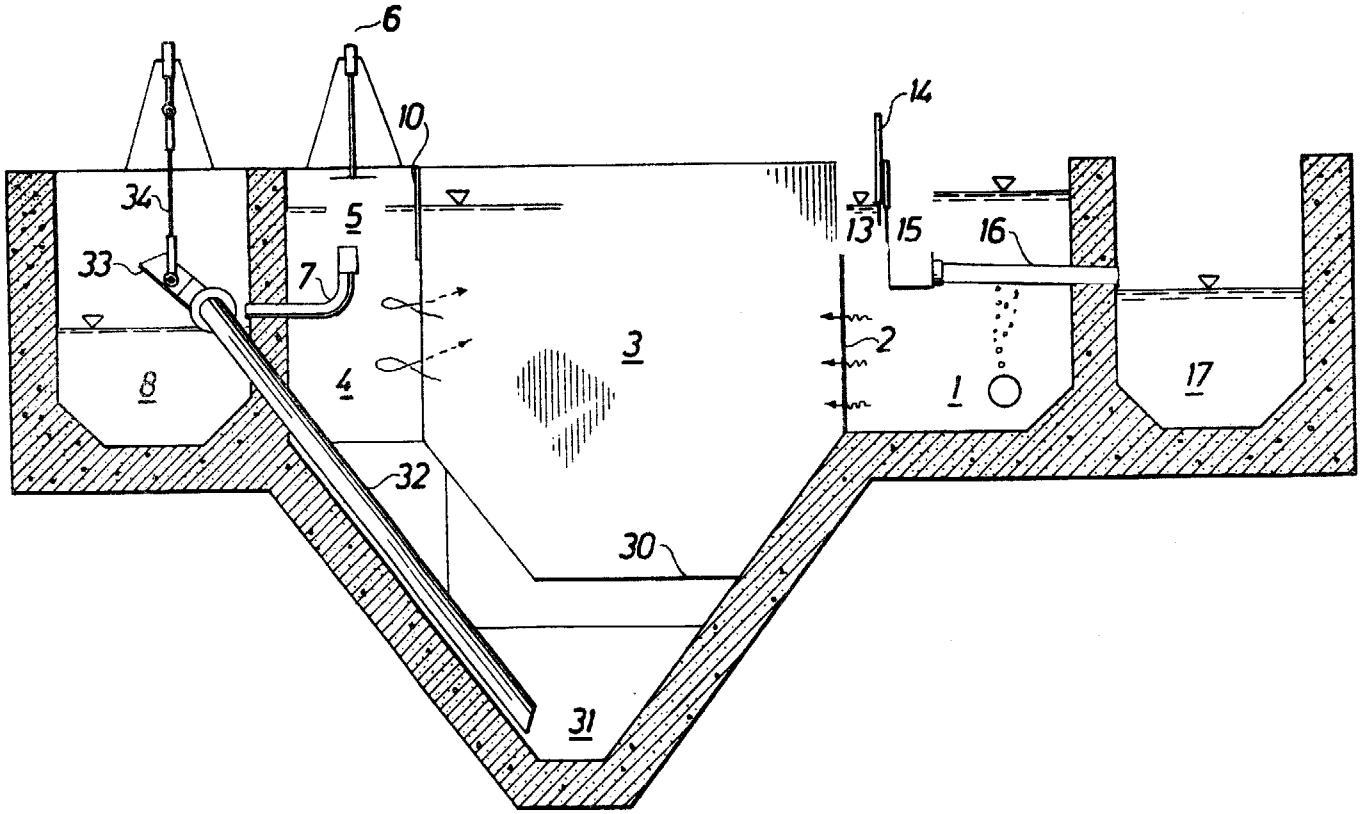
FIG. 3 shows a vertical cross section along the line III—III in FIG. 4 of another embodiment of the apparatus according to the invention.

FIG. 3 shows in section how separated settleable solids are collected and taken away in a system with only one bottom fraction. In this case, both input and output gaps have downward free openings 30, separated bottom material being collected in the chamber 31 and transported away from here, via a duct 32 and an overflow pipe provided with adjusting means 34, to the channel 8 for taking away. The task of the overflow pipe 33 is, similar to what was shown in FIG. 1, to create a hydrostatic differential pressure.

Figure 4:
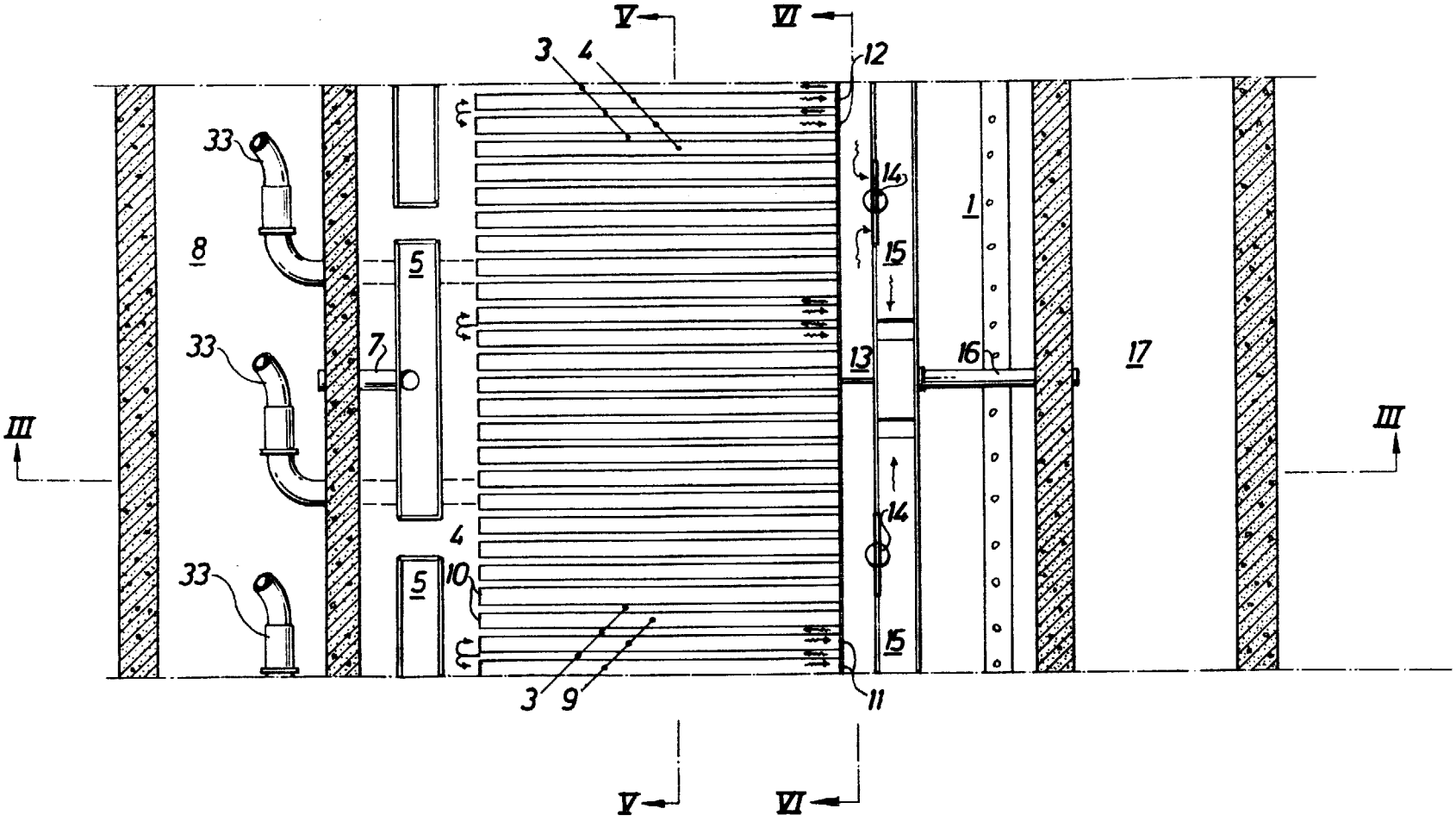
FIG. 4 shows a partial plan view of the apparatus according to FIG. 3.
Figure 5:
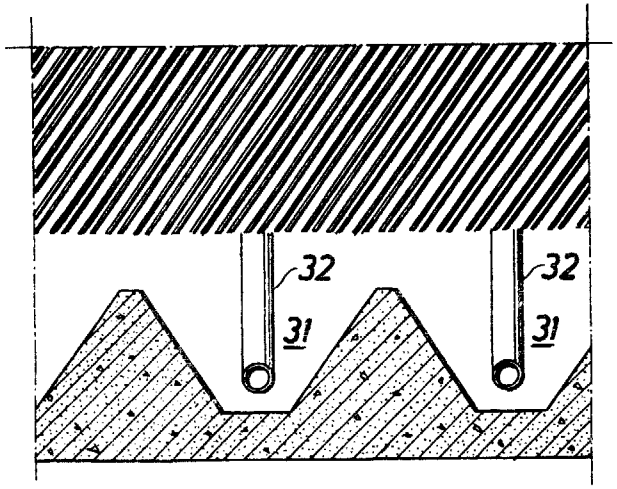

FIG. 4 shows a plan view of the lamella installation according to FIG. 3. In FIG. 5 there is seen the space 31 under the lamellae, with bottom ridges between the sludge removal tubes 32. As an alternative in larger plants, the bottom can be made flat for sludge scraping by machine.

Figure 6:
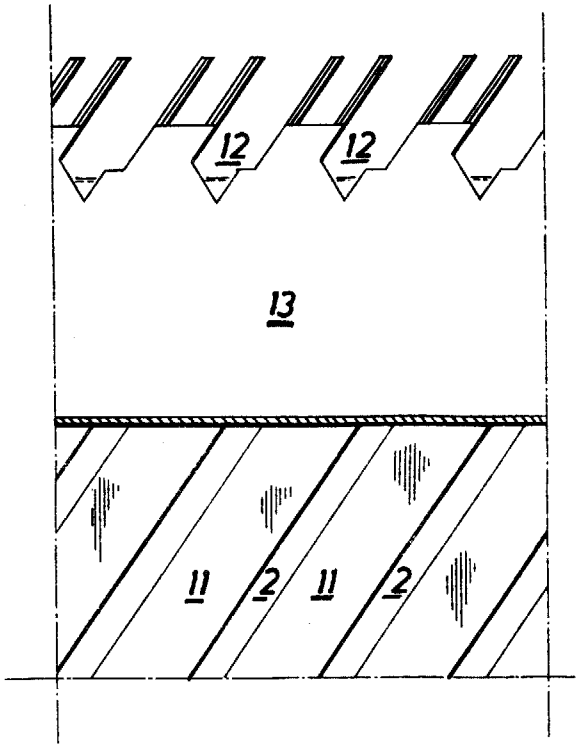
FIGS. 5 and 6 show partial sections through the apparatus according to FIGS. 3 and 4 along the lines V and VI in FIG. 4.

FIG. 6 is a sectional detail of the trough 13 illustrating how the water under the trough has a free passage through the openings 2 to the input gaps, while the screens 11 prevent the water from entering the output gaps. Above the trough there is the reverse situation where the openings 12 permit passage of treated water to the trough 13 from the output gaps, while the upstanding edges of the trough prevent water from the input gaps running over into the trough 13.

The function according to the present invention gives a plurality of self-evident advantages compared with previously known lamella technique within all the fields of application, such as treatment of surface water, tap water as well as municipal and industrial waste water. Further hereto, the lamella installation according to the invention can be applied to areas, e.g. storm water and overflow water, where conventional lamella technique has not been able to be applied without special consideration.

Thanks to the arrangement of turning the flow direction of the water mass in the chamber between the input and output gaps, oil and scum can be separated in an expedient way in the separate chamber intended herefor, at the side of the lamella chamber, and after required detention time in the input gaps of the lamella section.

The water flow backwards and forwards through the lamella unit also creates the possibility of obtaining a division of settled bottom substance into a light fraction and a heavier fraction. By suitably selecting the total lamella area in the input gaps compared with the corresponding surface in the output gaps, and starting from the rate of sinking for different particle sizes, the particle size limits for both bottom fractions can be selected comparatively freely. This possibility of division is very important in a plurality of applications, inter alia in separating sands and sludge from storm water, different fiber sizes from the waste water of pulp industries, sand/sludge from washing water in the food industry etc.

Division into one or two bottom fractions, a surface fraction and a clear phase gives the basic idea of the invention the character of a fraction distributor, for which reason this type of lamella installation has been given the title of "fractionator".

The method of separating fractions by hydrostatic differential pressure makes it possible continuously to take out different fractions from the system. In connection with varying and sometimes very great flows (e.g. in the treatment of storm water and overflow water) the lamella system according to the invention can serve essentially as a flow distributor. In turn, this makes it possible to utilize storm water and detention basins for storing extracted bottom and surface fractions instead of rainwater as in the case according to present day technique. A change in the function of the storm water basins to combined operation with the lamella system according to the present invention brings with it considerable savings in cost of basin volumes.

Treatment of overflow and storm water is carried out according to the present state of the art mainly with the help of storage volumes and has the object of creating uniformity of the peak flows occurring in the piping system during a rainy period. These storage volumes are usually designed as levelling-out basins, overflow basins, detention basins or rainwater basins. After rain has ceased, the contents of the basin can partially or completely be taken back to the water treatment plant for conventional treatment.

Two different systems occur in practice, namely with separate and combined piping systems. In the first case storm water and waste water (domestic waste water and the like) are carried in separate pipes, the latter to a waste water treatment plant, wherefrom purified water is taken to a receiving body of water and the former to a detention basin wherefrom a portion of the storm water can be taken to the waste water treatment works, but at least for a large incoming flow, the major portion can be taken directly to the receiving body of water. For large incoming flows, some of the water in the waste water system must be taken by spillways past the waste water treatment plant to the receiving body water.

In a combined piping system, the waste water and storm water are taken commonly to a waste water treatment plant. In order to take up larger incoming flows, spillways must also be used here, whereon the overflow water can partly be taken directly to the receiving body of water and partly to a detention basin from which a portion of the collected overflow water can possibly be taken to the waste water treatment plant.

The use of this technique with storage volumes is considerably limited by the excessively high investment costs. Even if the basins are dimensioned for rain with relatively moderate rain intensities, the basin volumes will be disproportionately large and expensive. Added to this, the levelling-off effect is limited, since the basins are quickly filled during normal rain intensities. Moreover, no proper water purifying process takes place in these basins.

Other methods have also been tried to a varying extent, such as straining, desludging, disinfection, flotation, filtering and chemical precipitation. Even if a certain purifying effect with regard to the water quality is obtained by these methods, the effect is however, limited to times with relatively low and constant flows. The constant difficulty is in the strongly varying loadings produced by rainfall. For these reasons, none of these methods has obtained any notable circulation. Only if these treatment methods are supplemented by detention basins can satisfactory treatment effects also be achieved for varying flows. This can however only be achieved at the expense of unreasonably high investment costs.

The present invention relates to a method in which considerable reduction in required storage volumes for overflow and storm water has been successful, simultaneously as there has been achieved in connection with the levelling-out of the flow an effect of improving water quality. Thanks to the reduction of basin volumes, the method brings with it considerable lower plant costs than with conventional levelling or detention basins.

Figure 7:
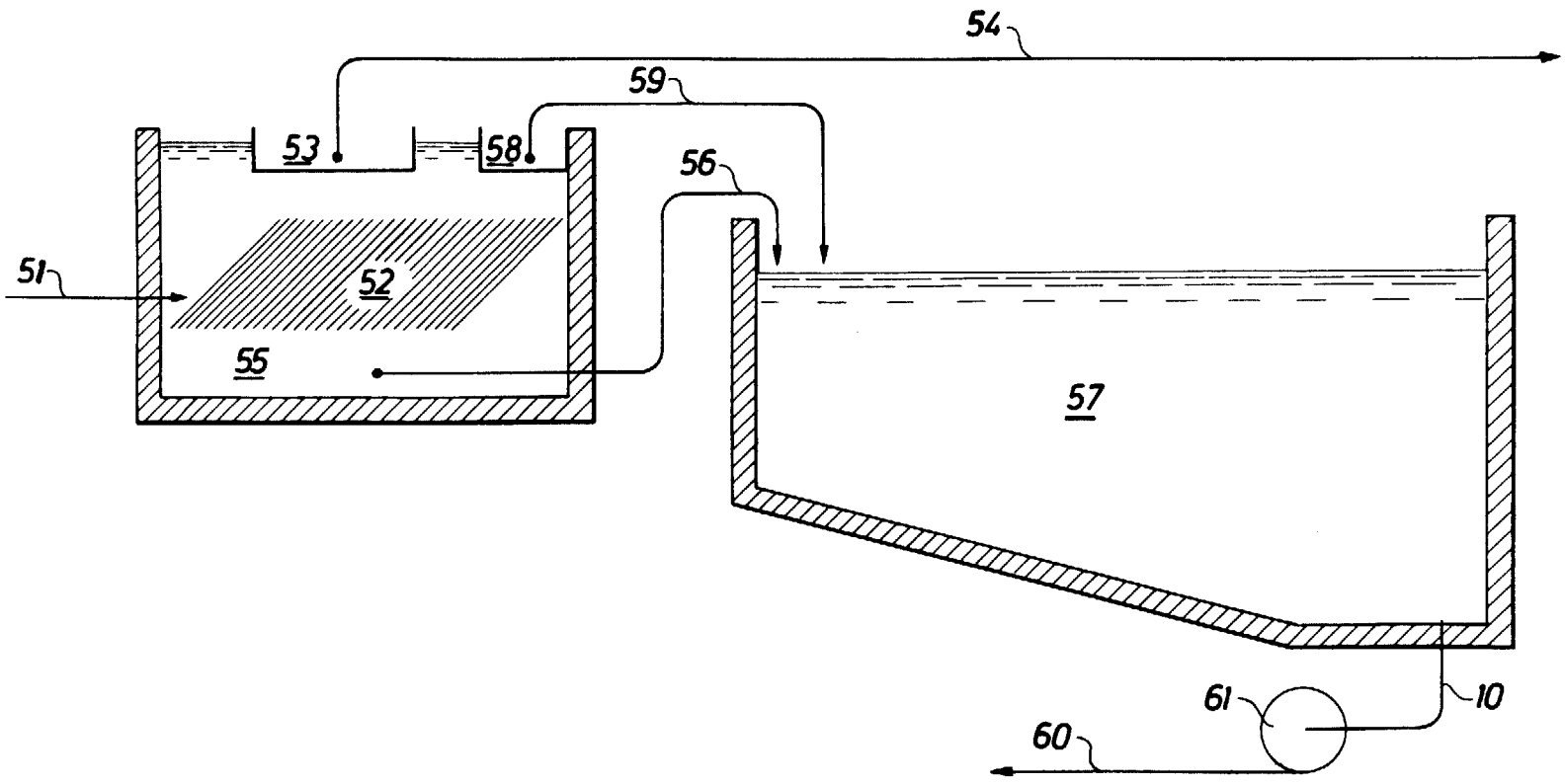
FIG. 7 shows schematically a plant for treating storm water and overflow water embodying an apparatus according to the invention.

FIG. 7 illustrates the treatment of waste water and storm water when using an apparatus according to the invention. The main principle is to distribute the rainwater before the detention basin into three or more fractions, whereby the rainwater proper is taken past the detention basin directly to the receiving body of water. The detention basin is intended for receiving instead the remaining fractions separated during the flow distribution, i.e. sand and bottom sludge as well as scum and oil. Since the flow for these fractions is only a fraction of the rainwater flow proper, the need of storage volume will naturally be heavily reduced.

Rainwater and/or overflow water is taken via a pipe 51 to a schematically shown lamella separating unit 52 according to the invention, as described in more detail above, in which the flow is divided into at least three different partial flows. The main flow, consisting of water which has been liberated from scum and settling sludge in the lamellae, is collected in a trough 53 and taken from here in a duct 54 to a receiving body of water. The bottom sludge is collected in a chamber 55 under the lamellae and is taken through a duct 56 to a storage basin 57. Scum and possible oil are collected in a trough 58 and taken through a duct 59 to the same storage basin 57. During periods when the associated waste water treatment plant is lightly loaded, preferably at night time in dry weather, the content of the basin is transported to ducts 60 and a pump 61 for further treatment and to render it innocuous.

As a result of the arrangement with double passages through the lamella gaps, the invention can moreover be used for separating by means of flotation in the input gaps simultaneously with sedimentation in the output gaps. In this case, finely divided air bubbles are supplied either in the inlet channel 1 or by addition into the incoming flow in a suitable space before water is passed to the inlet channel. The air bubbles adhere to suspended material which floats up to the surface within the inlet gaps 3 and which can then be removed as scum by the apparatus 5 and 6. Heavier particles settle simultaneously in the input gaps while light particles which have not been entrained by the air settle in the outlet gaps. This combination of flotation/sedimentation is especially usable in purifying such waste water containing fractions of substances which settle with difficulty.

The lamella system according to the invention furthermore gives a plurality of practical advantages from the point of view of maintenance and operation. By the arrangement with separate chambers for oil and scum removal, there has been provided at the same time a free communication possibility down to the chamber under the lamellae, which naturally facilitates all kinds of inspection and cleaning work.

The lamella system allows grouping of incoming and outgoing channels on one side of the lamella structure, and channels for all extracted fractions on the other side. This also creates further good inspection possibilities and contributes to a linear disposition of the different units in the lamella installation.

I claim:

[1. Apparatus for separating settleable and floating materials from polluted water, comprising an inlet means for supplying water to the apparatus, an assembly of a plurality of spaced parallel lamellae defining narrow passages arranged for the flow of water in a mainly horizontal direction through said passages, said passages comprising a first set of passages which communicate along one side of the assembly with the inlet means, so that the water can enter said first set of passages and flow in parallel therethrough toward the opposite side of said assembly, and a second set of passages which are closed toward the inlet means at said first side of the assembly, a flow reversal chamber arranged along said opposite side of the assembly and communicating with both said first set of passages and said second set of passages, so that water may enter said flow reversal chamber from said first set of passages and then enter said second set of passages to flow in parallel therethrough and in an opposite direction to the flow of water through said first set of passages, means for removal of floating separable material in said flow reversal chamber, outlet means communicating with said second set of passages at the ends thereof opposite to the flow reversal chamber, said passages being at least partially open at their bottoms, so that settleable solids leave said passages in a downward direction, and means for collecting and settleable solids.]

[2. An apparatus as claimed in claim 1, wherein the lamellae system further comprises means to separate the settleable material into two fractions.]

[3. An apparatus as claimed in claim 2, wherein the first set of passages have one portion of the bottom section closed and the second portion open and wherein the second set of parallel extending passages have one bottom portion closed in the region opposite the open portion of the bottoms of the first set of passages and the second set of passages have a second bottom portion open in the region opposite the closed portion of the first set of passages.]

[4. An apparatus as claimed in claim 1, further comprising means to add air in the inlet means to assist in the separation of flotation material in said first set of passages.]

[5. An apparatus as claimed in claim 1, for treating overflow or storm water further comprising, means to supply the ingoing flow of overflow or storm water to the inlet means of the device, a detention basin, means to transport the overflow associated with the floating separable material and the overflow associated with said settleable material to said detention basin, and means to transport the material in the detention basin back to the inlet means of the device.]

*6. Apparatus for separating settleable and floating materials from polluted water, said apparatus comprising:*

*an inlet means through which water is supplied to the apparatus;*

*an assembly of a plurality of spaced parallel lamellae defining narrow passages arranged for the flow of water in a mainly horizontal direction through said passages, said passages comprising a first set of passages which communicate along one side of the assembly with the inlet means, so that the water can enter said first set of passages and flow in parallel therethrough toward the opposite side of said assembly, and a second set of passages which are closed toward the inlet means at said first side of the assembly;*

*a flow reversal chamber arranged along said opposite side of the assembly and communicating with both said first set of passages and said second set of passages, so that water may enter said flow reversal chamber from said first set of passages and then enter said second set of passages to flow in parallel therethrough and in an opposite direction to the flow of water through said first set of passages;*

*the passages of said first set of passages alternating with the passages of said second set of passages, so that the water flows in opposite directions along opposite faces of at least some of said lamellae;*

*means closing only the top portions of the ends of said second set of passages opposite to the inlet means, so as to prevent flow into said second set of passages from an upper area of said flow reversal chamber while permitting flow from a lower area thereof;*

*outlet means communicating with said second set of passages at the ends thereof opposite to the flow reversal chamber;*

*said passages being at least partially open at their bottoms, so that settleable solids leave said passages in a downward direction; and*

*means for collecting said settleable solids.*

*7. Apparatus for separating settleable and floating materials from polluted water, said apparatus comprising:*

*a housing defining an inlet zone extending along a side of the housing, a flow reversal zone extending along an opposite side of the housing and a separating zone between said inlet and flow reversal zones;*

*an assembly of a plurality of spaced parallel lamellae in said separating zone and defining narrow passages arranged for the flow of water in a mainly horizontal direction through said passages, said passages comprising a first set of passages which communicate with said inlet zone along one side of the assembly and with said flow reversal chamber along the opposite side of the assembly, so that water can enter said first set of passages and flow in parallel therethrough toward said flow reversal zone, and a second set of passages, which are closed toward the inlet zone along said first side of the assembly and which are closed toward said flow reversal zone along the opposite side of said assembly in a top portion, but open toward said flow reversal zone in a lower portion, so that water entering said flow reversal zone from said first set of passages can enter said second set of passages to flow in parallel therethrough and in an opposite direction to the flow of water through said first set of passages, the passages of each of said first and second sets being interspersed with passages of the other set within the assembly, said passages being at least partially open at their bottoms so that settleable solids leave said passages in a downward direction;*

*outlet means communicating with said second set of passages at the ends thereof opposite to the flow reversal zone;*

*means for removing floatable separable material in said flow reversal zone; and*

*means for collecting said settleable solids.*

*8. Apparatus for separating settleable and floating materials from polluted water, said apparatus comprising:*

*an elongated inlet channel through which water is supplied to the apparatus;*

*an assembly of a plurality of horizontally spaced vertically extending parallel lamellae defining narrow passages arranged for the flow of water in a mainly horizontal direction through said passages, said passages comprising a first set of passages which communicate along one side of the assembly with the inlet channel, so that the water can enter said first set of passages and flow in parallel therethrough toward the opposite side of said assembly, and a second set of passages which are closed toward the inlet channel at said first side of the assembly;*

*an elongated flow reversal chamber arranged along said opposite side of the assembly and communicating with both said first set of passages and said second set of passages, so that water may enter said flow reversal chamber from said first set of passages and then enter said second set of passages to flow in parallel therethrough and in an opposite direction to the flow of water through said first set of passages;*

*the passages of said first set of passages alternating with the passages of said second set of passages, so that the water flows in opposite directions along opposite faces of at least some of said lamellae;*

*means closing only the top portions of the ends of said second set of passages opposite to the inlet channel, so as to prevent flow into said second set of passages from an upper area of said flow reversal chamber while permitting flow from a lower area thereof;*

*an elongated outlet channel communicating with said second set of passages at the ends thereof opposite to the flow reversal chamber;*

*said passages being at least partially open at their bottoms, so that settleable solids leave said passages in a downward direction; and*

*means for collecting said settleable solids.*

*9. Apparatus for separating settleable and floating materials from polluted water, said apparatus comprising a housing defining an elongated inlet channel extending*

*along a side of the housing, an elongated flow reversal chamber extending along an opposite side of the housing and a separating zone between said inlet channel and said flow reversal chamber;*

*an assembly of a plurality of horizontally spaced vertically extending parallel lamellae in said separating zone and defining narrow passages arranged for the flow of water in a mainly horizontal direction through said passages, said passages comprising a first set of passages which communicate with said inlet channel along one side of the assembly and with said flow reversal chamber along the opposite side of the assembly, so that water can enter said first set of passages and flow in parallel therethrough toward said flow reversal chamber, and a second set of passages, which are closed toward the inlet channel along said first side of the assembly and which are closed toward said flow reversal chamber along the opposite side of said assembly in a top portion, but open toward said flow reversal chamber in a lower portion, so that water entering said flow reversal chamber from said first set of passages can enter said second set of passages to flow in parallel therethrough and in an opposite direction to the flow of water through said first set of passages, the passages of each of said first and second sets being interspersed with passages of the other set within the assembly, said passages being at least partially open at their bottoms so that settleable solids leave said passages in a downward direction;*

*an elongated outlet channel communicating with said second set of passages at the ends thereof opposite to the flow reversal chamber;*

*a trough for removing floatable separable material in said flow reversal chamber; and*

*means for collecting said settleable solids.*

*10. Apparatus for separating settleable and floating materials from polluted water, comprising*

*an inlet means for supplying water to the apparatus,*

*an assembly of a plurality of spaced parallel lamellae defining narrow passages arranged for the flow of water in a mainly horizontal direction through said passages, said passages comprising a first set of passages which communicate along one side of the assembly with the inlet means, so that the water can enter said first set of passages and flow in parallel therethrough toward the opposite side of said assembly, and a second set of passages which are closed toward the inlet means at said first side of the assembly,*

*a flow reversal chamber arranged along said opposite side of the assembly and communicating with both said first set of passages and said second set of passages, so that water may enter said flow reversal chamber from said first set of passages and then enter said second set of passages to flow in parallel therethrough and in an opposite direction to the flow of water through said first set of passages,*

*means for removal of floating separable material in said flow reversal chamber,*

*outlet means communicating with said second set of passages at the ends thereof opposite to the flow reversal chamber, said passages being at least partially open at their bottoms, so that settleable solids leave said passages in a downward direction, and*

*means for collecting said settleable solids,*

*the lamellae system further comprises means to separate the settleable material into two fractions, and*

*the first set of passages have one portion of the bottom section closed and the second portion open and wherein the second set of parallel extending passages have one bottom portion closed in the region opposite the open portion of the bottoms of the first set of passages and the second set of passages have a second bottom portion open in the region opposite the closed portion of the first set of passages.*

* * * * *